United States Patent [19]
Doyle et al.

[11] Patent Number: 5,730,181
[45] Date of Patent: Mar. 24, 1998

[54] MASS FLOW CONTROLLER WITH VERTICAL PURIFIER

[75] Inventors: Michael J. Doyle, Villa Park; Nelson Urdaneta, Mission Viejo; Kim N. Vu, Yorba Linda, all of Calif.

[73] Assignee: Unit Instruments, Inc., Yorba Linda, Calif.

[21] Appl. No.: 758,971

[22] Filed: Dec. 2, 1996

Related U.S. Application Data

[63] Continuation of Ser. No. 584,712, Jan. 11, 1996, abandoned, which is a continuation of Ser. No. 469,797, Jun. 6, 1995, abandoned, which is a continuation of Ser. No. 275,605, Jul. 15, 1994, abandoned.

[51] Int. Cl.$^6$ ............................................. G05D 7/06
[52] U.S. Cl. ................................. 137/487.5; 73/200
[58] Field of Search ........................... 137/486, 487.5, 137/549; 73/198, 200

[56] References Cited

U.S. PATENT DOCUMENTS

| | | | |
|---|---|---|---|
| 3,048,035 | 8/1962 | Richards | 73/200 |
| 4,507,453 | 3/1985 | Tom | 526/283 |
| 4,520,181 | 5/1985 | Kolsiewicz | 525/247 |
| 4,584,425 | 4/1986 | Tom | 585/827 |
| 4,603,148 | 7/1986 | Tom | 521/31 |
| 4,604,270 | 8/1986 | Tom | 423/262 |
| 4,659,552 | 4/1987 | Tom | 423/219 |
| 4,661,575 | 4/1987 | Tom | 526/283 |
| 4,696,953 | 9/1987 | Tom | 521/146 |
| 4,716,181 | 12/1987 | Tom | 521/53 |
| 4,723,967 | 2/1988 | Tom | 137/625.46 |
| 4,738,963 | 4/1988 | Tom | . |
| 4,748,216 | 5/1988 | Tom | 526/77 |
| 4,761,395 | 8/1988 | Tom | 502/401 |
| 4,781,900 | 11/1988 | Tom et al. | 423/210 |
| 4,797,227 | 1/1989 | Tom et al. | 252/194 |
| 4,853,148 | 8/1989 | Tom et al. | 252/194 |
| 4,865,822 | 9/1989 | Tom et al. | 423/210 |
| 4,867,960 | 9/1989 | Tom | 423/488 |
| 4,925,646 | 5/1990 | Tom et al. | 423/488 |
| 4,928,524 | 5/1990 | Sugi | 73/200 |
| 4,936,877 | 6/1990 | Hultquist et al. | 55/16 |
| 4,950,419 | 8/1990 | Tom et al. | 252/194 |
| 4,960,568 | 10/1990 | Matsumoto et al. | 422/83 |
| 4,983,363 | 1/1991 | Tom et al. | 422/180 |
| 5,015,411 | 5/1991 | Tom et al. | 252/194 |
| 5,027,642 | 7/1991 | Wen et al. | 73/23.2 |
| 5,037,624 | 8/1991 | Tom et al. | 423/210 |
| 5,057,242 | 10/1991 | Tom et al. | 252/194 |
| 5,094,830 | 3/1992 | Tom et al. | 423/342 |
| 5,100,100 | 3/1992 | Benson | 137/486 X |
| 5,138,869 | 8/1992 | Tom | 73/31.03 |
| 5,151,395 | 9/1992 | Tom | 502/67 |
| 5,220,830 | 6/1993 | Bonne | 73/198 X |

FOREIGN PATENT DOCUMENTS

| | | | |
|---|---|---|---|
| 0 392 072 A1 | 10/1990 | European Pat. Off. | G05D 7/00 |
| WO 90/12239 | 10/1990 | WIPO | F16L 23/16 |

OTHER PUBLICATIONS

"System 3A Hygrometer," Panametrics, Inc., Dec. 1988.
"M Series Aluminum Oxide Moisture Sensor for Gases and Liquids," Panametrics, Inc., Feb. 1990.
"System I/O$_2$ Microprocessor–Based Moisture and Oxygen Content Analyzer," Panametrics, Inc., Mar. 1990.

*Primary Examiner*—Stephen M. Hepperle
*Attorney, Agent, or Firm*—Fitch, Even, Tabin & Flannery

[57] ABSTRACT

A mass flow controller and purifier has a canister arranged at right angles to a flow path through the mass flow controller. The canister holds a contaminant scavenging material which a gas stream contacts as it flows to remove a contaminant such as water. A purified process gas stream is fed through a bypass of a mass flow meter. A portion of the gas is supplied to a mass flow sensor which generates a signal indicative of a rate of mass flow. The mass flow signal is amplified and the amplified mass flow signal is linearized in a linearizer. The linearized mass flow signal is fed to a comparator which compares the linearized mass flow signal with an error signal and provides an output signal indicative of a mass rate of flow through the mass flow meter. A valve is connected to the mass flow meter and is controlled by the mass flow meter signal to meter the gas.

4 Claims, 4 Drawing Sheets

MASS FLOW CONTROLLER WITH VERTICAL PURIFIER

This application is a continuation, of application Ser. No. 584,712 filed Jan. 11, 1996, now abandoned, which is a continuation of application Ser. No. 08/469,797, filed Jun. 6, 1995, now abandoned, which is a continuation of application Ser. No. 08/275,605, filed Jul. 15, 1994, now abandoned.

BACKGROUND OF THE INVENTION

The invention relates in general to a mass flow controller and in particular to a mass flow controller having a gas stream purifier associated therewith.

Mass flow controllers, and in particular thermal mass flow controllers which include a thermal mass flow meter and a valve, are often used in gas shelf systems which form a component of equipment used in the manufacture of semiconductor devices. Such equipment can include chemical vapor deposition apparatus, diffusion equipment, plasma systems, sputtering systems, and the like. These systems have in common the need to receive precisely regulated flows of gas or vapor in order to carry out specific chemical or physical processes within the system, such as deposition, etching, diffusion, and the like. Such gasses and vapors can include hydrogen, oxygen, nitrogen, hydrogen chloride, boron trichloride, phosphorous oxychloride, silane, dicholorosilane, silicon tetrachloride, diborane, helium, argon, and the like. As the dimensions and design rules of integrated circuits steadily shrink, the need increases to increase the cleanliness of the operation. With increased need for cleanliness in the operation, purer and purer gas streams must be supplied to the equipment. If highly pure gas streams are not supplied to the equipment, defective integrated circuits may be produced.

Many of the gas suppliers supply highly pure gas, but of course the gas systems must be connected to the gas shelves and there is always a risk of introducing contaminants at that time. Although it is customary to flush the gas shelf plumbing with dry nitrogen, some contaminants may remain. In addition, contaminants may be inadvertently introduced by the gas suppliers or through other avenues. One of the most common contaminants is trace quantities of water vapor, which may for instance, if mixed with hydrogen chloride, corrode the gas shelf plumbing, damaging delicate instruments such as mass flow controllers. It is particularly important that such contaminants not be mixed with any of the reactive gases or vapors which are used for manufacturing semiconductors, or contaminant reaction products may be introduced into the semiconductor process chambers.

In addition, from the standpoint of the use of mass flow controllers, if such contaminants form inside a mass flow controller, they can alter the thermal response of the very small bore metal tube through which the gas is flowed past a pair of self-heated electrical resistance elements, thereby changing the electrical response characteristic of the flow controller and thereby altering the amount of gas which is being supplied to the process chamber.

In the past, some gas shelf users have incorporated in-line purification systems with mass flow controllers for the purpose of removing impurities from the gas stream. Such in-line purification systems, however, cannot be fitted onto standard gas shelves since standard gas shelves are plumbed for a standard footprint mass flow controller and the horizontal or in-line purifier extends off the front end of the flow controller. There simply is not space on the gas shelf for retrofitting such a purifier. Of course, the gas shelf could be extensively replumbed to insert such a purifier in line with a mass flow controller, but this would necessitate taking the gas shelf out of service and opening all of the gas shelf lines, which would be very labor intensive and very expensive.

What is needed is a compact purifier and mass flow controller which can fit within the footprint of a standard mass flow controller so that the apparatus can simply be substituted onto a gas shelf for a standard flow controller with minimal difficulty.

SUMMARY OF THE INVENTION

A mass flow meter in combination with a vertical purifier provides a number of advantages to semiconductor equipment manufacturers. The mass flow controller is a thermal mass flow controller built in modular sections incorporating a mass flow meter block having built therein a bypass which is positioned between a mass flow meter gas inlet and a mass flow meter gas outlet. A sensing tube is connected to the bypass at an upstream portion and at a downstream portion so that as the bypass develops a pressure drop from the flowing gas. A small portion of the gas is forced through the sensing tube. The sensing tube has a pair of self-heated electrical windings wound thereabout in good thermal contact to effect rapid heat transfer. One winding is positioned upstream of the other. The windings form part of a bridge circuit. As the gas flows through the sensing tube and the windings are energized, the upstream winding is preferentially cooled with respect to the downstream winding, causing a shift in a tap voltage between the windings, which is indicative of the gas flow rate through the mass flow controller.

The bridge signal is then amplified in an amplification section and linearized by a linearizer circuit. The amplified linearized signal is then fed to a comparator, which compares a set point signal with the amplified linearized flow signal and develops a linearized error signal as a result. The linearized error signal is then used to control a valve driver circuit, which feeds current to a solenoid valve connected downstream of the mass flow meter block. The solenoid valve is mounted on a valve block, which receives the gas flow at a valve block inlet, feeds the gas through the valve and then out of a valve block outlet. The mass flow meter block and the valve block have substantially flat faces formed thereon, with offset edges for gripping a metal seal therebetween, solely between the edges, to form a Z-type seal.

In order to reduce the amount of a contaminant, such as water vapor, which may be found in the gas stream, a modular vertical purifier positioned on a vertical purifier block is connected at the vertical purifier block to the mass flow meter block. The vertical purifier block includes a gas inlet for receiving the gas, an inlet passage for delivering the gas to a vertical purifier cartridge, an outlet pass for receiving the purifier gas stream from the cartridge, and an outlet opening fitted with the same type of seal as is positioned between the mass flow meter block and the valve block. The vertical purifier is a canister type purifier. The canister comprises a right circular cylindrical outer wall having a circular upper wall and a circular bottom wall for defining a volume which is partially filled with a beaded resin purifier or contaminant scavenger. A purifier inlet tube extends from a poppet valve at the bottom of the purifier up through a substantial portion of the canister height and terminates at a particulate filter to insure uniform flow throughout the resin bed. The poppet valve at the inlet prevents contamination of the resin when the canister is separate from the block prior to assembly. The inlet tube causes the gas stream to exit into the purification volume at the top of the canister. This spreads the contaminated gas stream and insures that the contaminated gas stream will flow down through the entire height of the beads within the canister to avoid fingering, which might result in localized exhaustion of the contaminant scavenger beads prematurely.

In order to prevent the beads or particulates from clogging the inlet tube, a fritted diffuser is positioned at the inlet tube end. The contaminated gas then flows past and in contact with the beads; which remove the water vapor from the gas stream by molecular absorption or adsorption. A purified gas stream then flows to the bottom of the canister, where the gas is forced through an outlet pipe past a popper valve positioned in the pipe for preventing inadvertent contamination of the pellets prior to connection with the mass flow meter block.

The canister, it may be appreciated, extends vertically or perpendicular to the gas stream, thereby occupying very little space on the gas shelf. That canister, taken in conjunction with a thermal sensor tube of the mass flow meter which is positioned transversely with respect to the gas stream, allows the combination purifier and mass flow controller to be built with the same footprint as previously available mass flow controllers. This allows easy replumbing of the purifier and mass flow controller combination into an existing gas shelf without the need to replumb the entire gas shelf simply to receive a purifier. In addition, the purifier canister is connected to the purifier block by a plurality of threaded fasteners, which allows the canister to be easily removed from the purifier block and a new canister switched therein at regular periods.

In the present embodiment, the canister is assumed to be able to remove water vapor at impurity concentrations as high as one part per million for a year of regular use of the mass flow controller. Thus, the connection need not be broken between the inlet to the entire purifier system and mass flow controller; the canister need merely be removed from the block. A new canister having purifier pellets therein may then be connected to the block and is only exposed to gases outside the canister as the canister is engaged on the block, because the poppet valves at the inlet and the outlet tubes to the canister are engaged by engaging means on the block causing them to open as the canister is connected to the block. The mass flow controller is then flushed with dry nitrogen, which removes any relatively small volumes of contaminants which might have been introduced by the canister exchange operation and the system is ready to be placed back into operation.

It may be appreciated that with this system, conventional gas shelves can accept mass flow controllers and purifiers having considerably extended mass flow controller life. This avoids the need for removing the flow controller from the gas shelf and substituting a new flow controller, which may be an expensive operation and may require characterization of the new mass flow controller in order to have a properly calibrated flow system prior to effecting further runs.

It is a principal aspect of the present invention to provide a mass flow controller and purifier which may be retrofitted into an existing gas shelf system without having to replumb the gas shelf system.

It is another aspect of the present invention to provide a mass flow controller and purifier having a removable purifier canister for allowing rapid refitting of fresh adsorbent to the purifier system.

It is a further aspect of the present invention to provide a mass flow controller and vertical purifier having modular features which allows the purifier, the mass flow meter, and a valve to be built in separate sections.

Other aspects and advantages of the present invention will be obvious to one of ordinary skill in the art upon perusal of the following specification and claims in light of the accompanying drawings.

DETAILED DESCRIPTION OF THE PREFERRED EMBODIMENT

Figure 1:
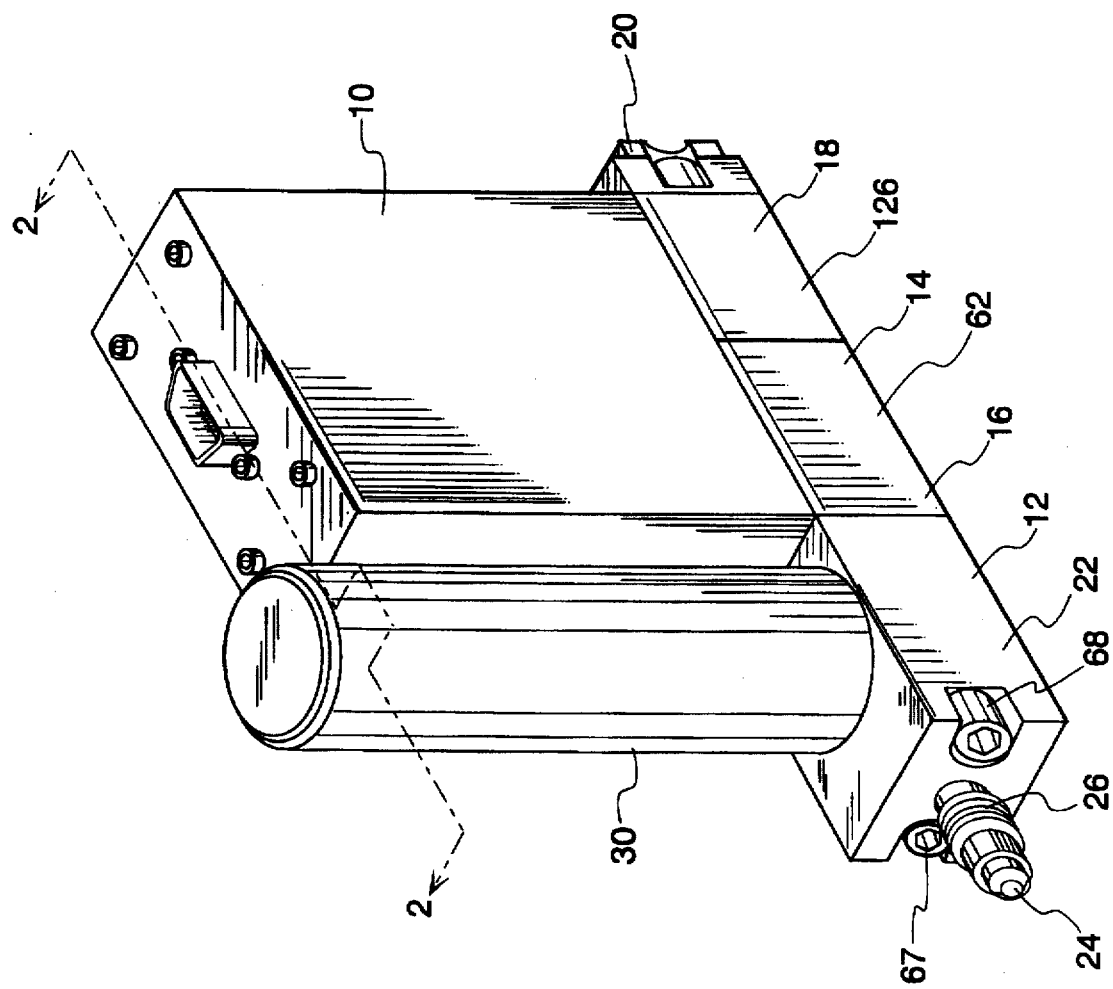
FIG. 1 is a perspective view of a mass flow controller and vertical purifier embodying the present invention.
Figure 2:
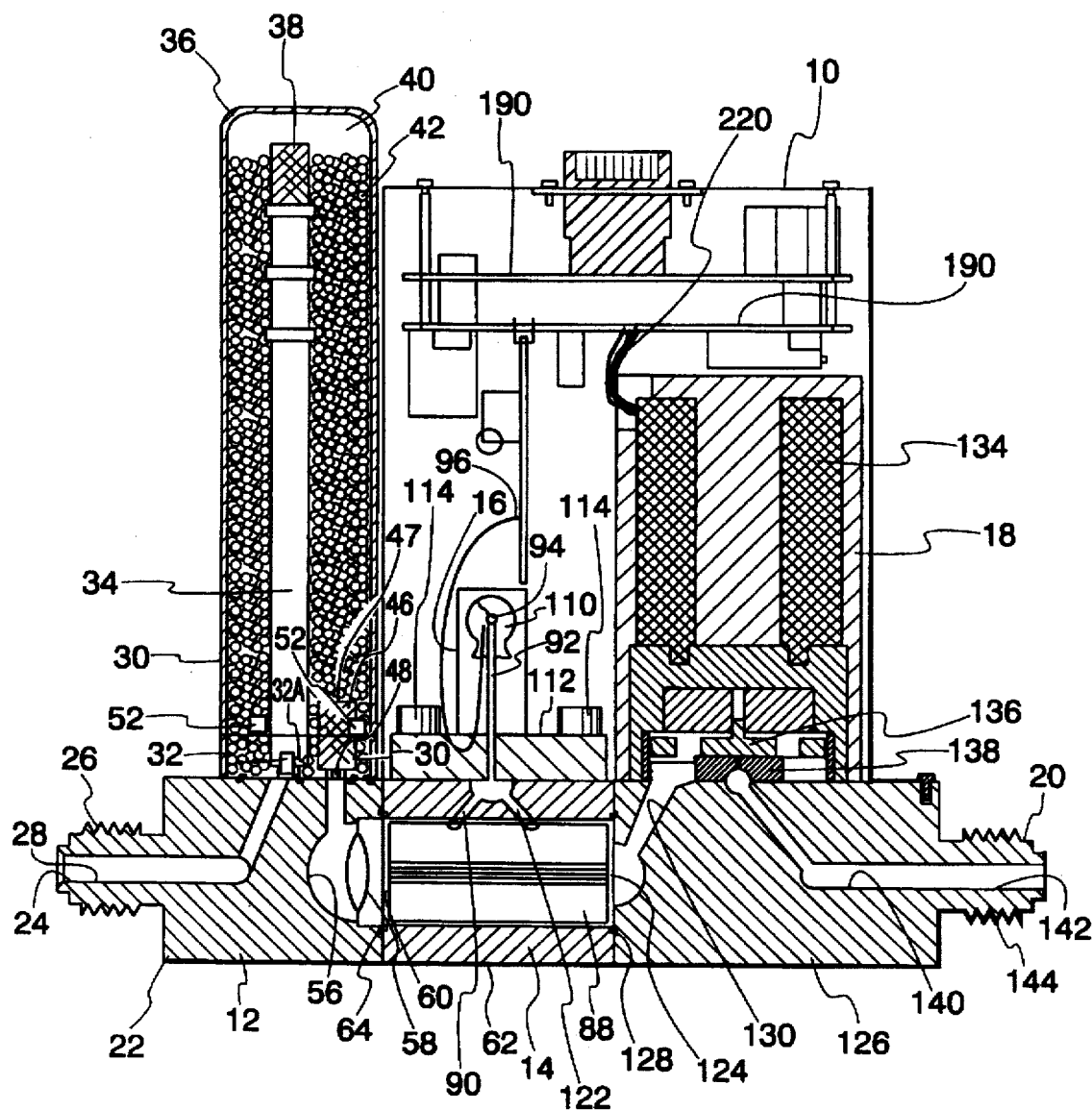
FIG. 2 is a sectional view taken substantially along the line 2—2 of FIG. 1.
Figure 6:
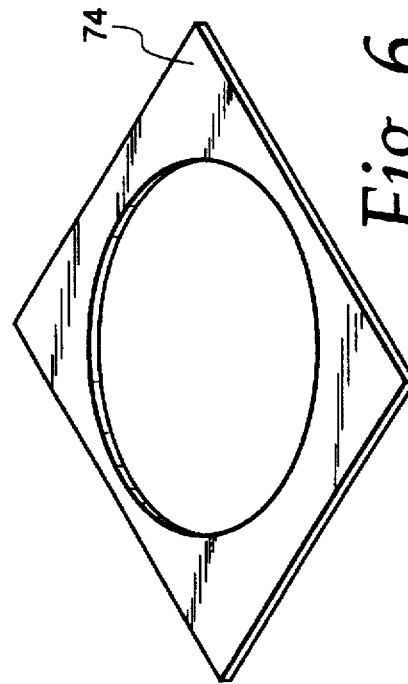
FIGS. 5 and 6 are perspective views of a ring portion of the metal seal and its keeper prior to assembly.
Figure 5:
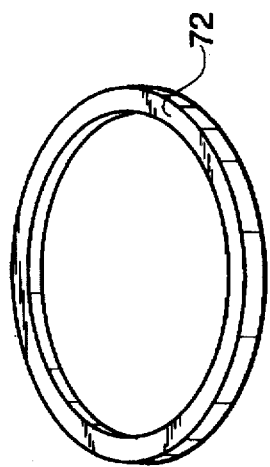
Figure 4:
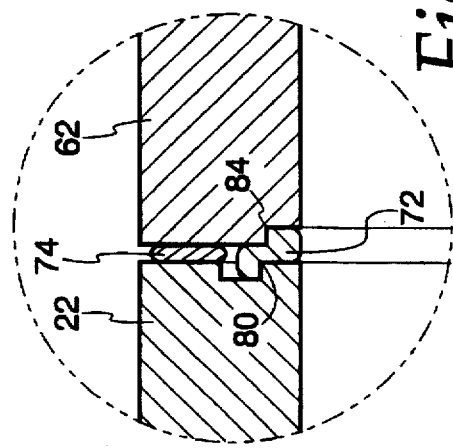
FIG. 4 is a view of the metal seal after the edges have made mating contact with the seal and deformed it.
Figure 3:
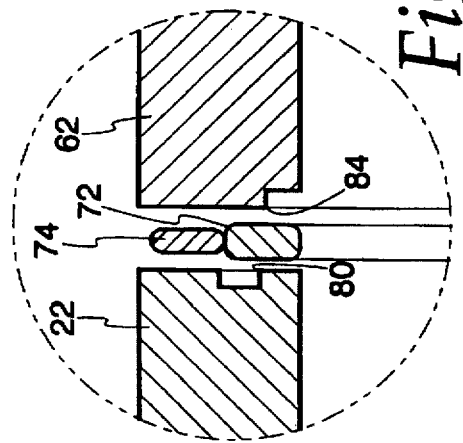
FIG. 3 is an enlarged view of a portion of the metal seal before the edges are brought into mating contact.

Referring now to the drawings and especially to FIGS. 1 and 2, apparatus embodying the present invention is shown therein and generally identified by reference numeral 10. The apparatus 10 comprises a purifier 12 connected in gas communication with a mass flow controller 14.

The mass flow controller 14 includes a mass flow meter 16 for developing a mass flow meter signal indicative of the flow rate of the gas which is used to control a valve 18 connected thereto. The valve 18 delivers gas through an outlet 20 to a downstream line on a gas shelf.

The purifier 12 includes a metal block 22 having an inlet opening 24 formed therein with a threaded portion 26 partially defining the inlet opening and adapted for connection with a Cajon fitting to receive process gas from an upstream source on the gas shelf. An inlet 28 is formed within the block 22 and delivers gas to a canister 30 extending vertically or at right angles from the general gas flow direction through the mass flow controller 14. The canister 30 has a popper valve 32 positioned at a bottom portion thereof, which normally seals an inlet line 34 from the outside. The popper valve is spring biased by a Belleville spring 32a into a closed position. This prevents unwanted contamination of the interior of the canister 30. The inlet line 34 extends to the upper portion of the canister, terminating in a fritted 40 to 60 micron particulate filter 38, which forms the exit within the canister 30 to a head space 40 for the contaminated process gas. Process gas then fills the head space 40 and is conducted downwardly through a resin bead bed of contaminant scavenging material 42. In the present embodiment, the resin is of the type which is sold as Nanochem beads by Matheson Electronics Products Group—Semi-Gas Systems, 825 Wool Creek Drive, San Jose, Calif. 95112. The contaminated gas passes through the bed 42, where the contaminant in this case, water; is removed from the gas and a purified gas stream exits from an outlet line 46 having a fritted filter 47 positioned thereon. The fritted filters 38 and 47 prevent the beads or particulates of the beads from entering the lines 46 or 34. In addition, the vertical purifier 12 provides a very compact system, since it provides long travel through the canister housing without occupying a large footprint because the flow through the housing of the canister is substantially at right angles to the normal flow path through the flow controller.

A popper valve 50 is provided at the bottom of the outlet line 46, also to prevent unwanted contamination when the canister is removed from the block 22.

It may be appreciated that the canister 30 is attached to the purifier block 22 by a pair of threaded fasteners 52, which allow the canister 30 to be easily switched while the entire purifier and flow controller base block configuration is left connected in the gas shelf plumbing into which it is originally installed.

An outlet line 56 in the purifier block 22 carries the purified gas to a Pall 0.1 μ filter 58 for preventing particulate contamination. The filter 58 delivers the gas to a flow chamber 60 in a mass flow meter block 62. The vertical purifier block 22 and the mass flow meter block 62 have an edge-type or Z-seal 64 positioned between them to provide very good sealing. The blocks are held together by a pair of threaded fasteners 67 and 68.

Details of the seal are best shown in FIGS. 3 through 6. In particular, the seal before sealing engagement is exemplified by a seal ring 72, as may best be seen in FIG. 5. The seal ring may be positioned in a metal keeper 74, which is thinner than the seal ring. The edges 80 and 82, which are formed from right angle faces but which are flush, engage the ring 72 and deform it into a Z-shape. The keeper 74 keeps the ring properly located while the deformation process is carried through and also operates as a stop to prevent overtightening of the seal.

A bypass 88 is positioned within the bore 60 to provide a pressure drop across the mass flow meter block and feeds a portion of the gas through an inlet 90 to a sensor tube 92 having a winding 94 positioned thereabout. The winding 94 is tapped and is connected to a printed circuit board through wiring 96. In particular, the winding comprises a pair of resistances 100 and 102, which are also shown in the block diagram of FIG. 7 as comprising a portion of a bridge 104. The windings 100 and 102 are surrounded by a thermal blanket 110 for preventing convective perturbation of the temperature distribution of the sensor tube 92, which is generally U-shaped and positioned transversely with respect to the gas stream. The sensor tube 92 is supported by a base 112 connected by threaded fasteners 114 to the block 62. Gas exiting the U-shaped sensor tube 92 flows into an outlet channel 122 in the block 62, which is delivered to the bypass and ultimately delivered at an outlet 124 of the mass flow meter block 62 to a valve block 126. The mass flow meter block 62 and valve block 126 are sealed by a Z-type seal 128 of the type previously discussed. The gas is then fed through an inlet tube 130 defined in the valve block 126 to the valve 18. The valve 18 has a solenoid 134 wound therein for movement of a member 136 toward and away from a valve seat 138 to control the flow of gas from the valve into an outlet bore 140, which is connected via a Z-type seal to the outlet fitting 20. The outlet fitting 20 has an outlet bore 142 defined therein, which extends through a threaded Cajon fastener-type fitting 144. The valve 134 is controlled by circuitry as will be discussed in more detail hereafter.

Figure 7:
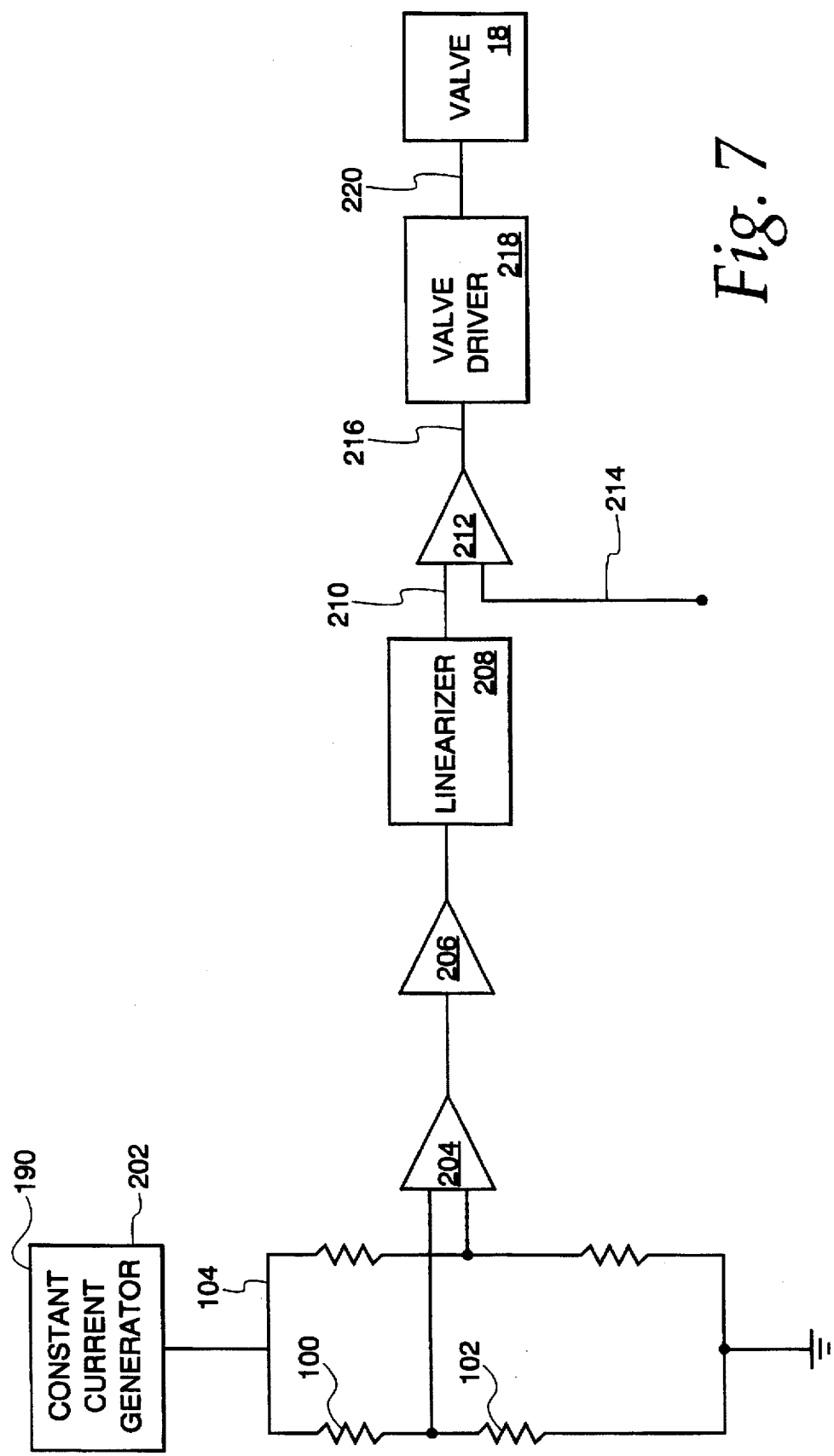
FIG. 7 is a block diagram of the circuitry of the mass flow controller.

The resistances 100 and 102 which are wound around the sensor tube, as may best be seen in FIG. 7, form a portion of a circuit 190 which includes a bridge circuit 200, which is driven by a constant current generator 202. Bridge potential indicative of the mass rate of flow of the gas is amplified by a bridge amplifier 204, which feeds a speed-up amplifier 206 to increase performance of the mass flow controller 14. The amplified voltage is then fed to a linearizer 208, which provides piece-wise or segmented linearization to provide a linearized flow signal on a line 210 to a comparator 212. The comparator 212 also receives a set point signal on a line 214 and produces a flow error signal on a line 216. The flow error signal is sent to a valve driver circuit 218 providing amplification and valve drive current in response thereto. The valve driver circuit 218 is connected through a line 220 to the valve 18 to supply current to the solenoid 134 for controlling the flow of gas.

While there has been illustrated and described a particular embodiment of the present invention, it will be appreciated that numerous changes and modifications will occur to those skilled in the art, and it is intended in the appended claims to cover all those changes and modifications that fall within the true spirit and scope of the present invention.

What is claimed is:

1. A mass flow meter and vertical purifier for removing a contaminant from a stream of process gas and determining the mass rate of flow of the process gas comprising:

an inlet connected to receive a process gas;

a mass flow sensor coupled to receive at least a portion of the process gas from the inlet and to generate a mass flow signal;

means for comparing the mass flow signal to a set point signal and providing a control signal in response thereto;

a container connected to receive the flow of process gas and positioned so that gas flow within a portion of the container containing a contaminant scavenging material is oriented primarily perpendicular to the flow of gas from the inlet to the outlet of the mass flow meter; and an outlet for delivering the stream of process gas to another piece of equipment.

2. A mass flow meter and purifier according to claim 1 wherein the container is easily removable from the mass flow meter in order to substitute a new container with fresh scavenging material in gaseous communication with the mass flow meter.

3. A mass flow meter and purifier according to claim 1 wherein the canister further comprises a valve for sealing the canister closed, which valve may be forced into an open position when the canister is connected in gaseous communication with the mass flow meter.

4. A mass flow meter and purifier according to claim 1 wherein the mass flow sensor is positioned on a modular block having a bypass positioned therein and the container is removably mounted on a modular block connected to the mass flow meter block with the container extending perpendicularly from a process gas flow path through the block.

* * * * *